Figure 1:
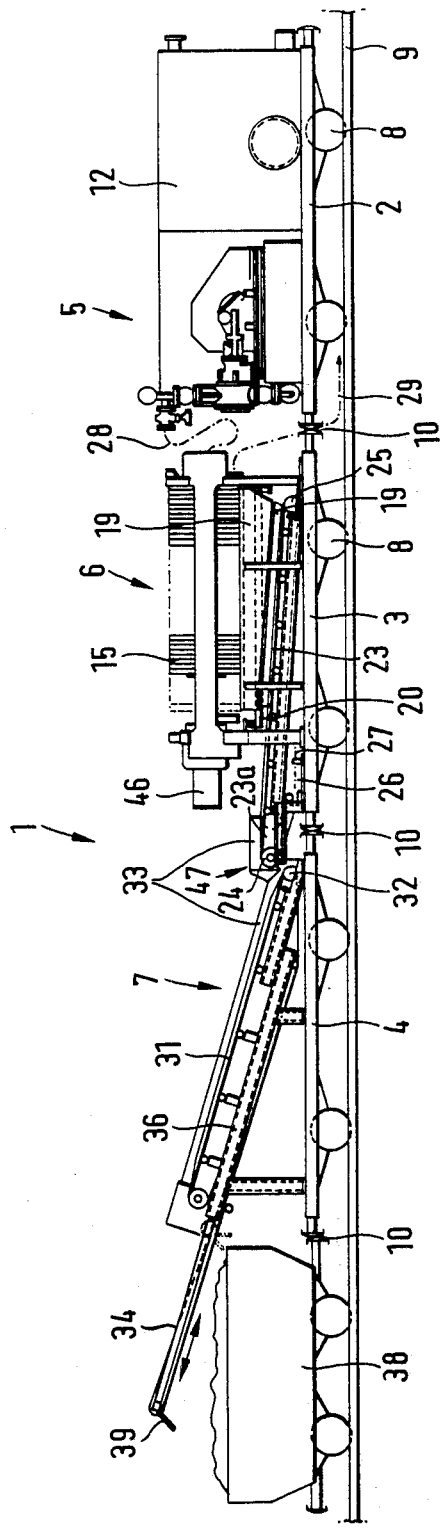

United States Patent [19]

Schlesiger

[11] Patent Number: 4,655,916
[45] Date of Patent: Apr. 7, 1987

[54] MOBILE SLUDGE HANDLING APPARATUS

[75] Inventor: Jost Schlesiger, Mürlenbach, Fed. Rep. of Germany

[73] Assignee: Feluwa Schlesiger & Co. KG, Fed. Rep. of Germany

[21] Appl. No.: 744,322

[22] Filed: Jun. 13, 1985

[51] Int. Cl.⁴ .......................................... B01D 35/00
[52] U.S. Cl. .................................... 210/173; 210/241; 210/258; 210/259; 210/224; 405/128; 414/406; 414/502; 414/339; 414/345
[58] Field of Search ............... 210/241, 258, 259, 173, 210/224, 523; 405/129, 128; 414/409, 406, 418, 502, 518, 527, 528, 398, 339, 345

[56] References Cited

U.S. PATENT DOCUMENTS

| 1,652,423 | 12/1927 | Belke | 210/241 |
| 2,562,539 | 7/1951 | Ellis et al. | 414/518 |
| 3,279,603 | 10/1966 | Busse | 210/259 |
| 3,630,365 | 12/1971 | Woodbridge et al. | 210/241 |
| 4,203,836 | 5/1980 | Hallack | 210/258 |

FOREIGN PATENT DOCUMENTS

| 2740894 | 3/1979 | Fed. Rep. of Germany | 210/241 |
| 1059935 | 2/1967 | United Kingdom | 414/345 |
| 1540172 | 2/1979 | United Kingdom | 210/241 |

Primary Examiner—Bernard Nozick
Attorney, Agent, or Firm—Diller, Ramik & Wight

[57] ABSTRACT

There is disclosed a mobile sludge handling apparatus which comprises first, second and third vehicles (2, 3, 4) which are coupled together to form a composite mobile unit. The first vehicle (2) carries a sludge-pump unit (5), and the second vehicle (3) carries a filter unit (6) which is arranged to receive sludge pumped thereto from the first vehicle (2) and to separate-out solid material from the sludge. The third vehicle (4) carries a conveyor unit (7) which is arranged to receive separated-out solid material from the second vehicle (3) and to convey such material to a discharge point for the apparatus. The apparatus is particularly suitable for use as an underground device for draining mining sludge, in which sludges or slurries of liquid and solid material underground can be processed on the first and second vehicles (2, 3), and only the solid residue is conveyed by the conveyor unit (7) on the third vehicle (4) to be collected in tubs (38) which are then transported to the surface for subsequent discharge of the solid material.

13 Claims, 2 Drawing Figures

U.S. Patent  Apr. 7, 1987  4,655,916

MOBILE SLUDGE HANDLING APPARATUS

This invention relates to mobile sludge handling apparatus which is particularly, though not exclusively, suitable for use as an underground device for the drainage of mining-type sludges or slurries.

In underground working it is most usual to catch the accumulated dead rock with water in so-called sumps and to pile it there, whereupon the dead rock forms a sludge with water. The sumps may therefore be a considerable length. To carry this amount of sludge away from the sumps, dumpers with tub-shaped containers are used which are conveyed by means of mine cages above ground where the sludge is emptied or processed at suitable locations. Transportation of this type is very expensive since considerable amounts of sludge are to be transported.

There is therefore a requirement to produce an underground device for the draining of mining sludge and for its transportation, with which the solid substance in the mining sludge is separated from the liquid, and only the solid is transported, and which has a compact construction and can be easily transported to various locations. The mobile sludge handling apparatus according to the invention is characterised in that the apparatus forms a movable unit comprising three vehicles (chassis) coupled together, the first chassis of which is occupied by a pump unit, the second chassis by a filter plant and the third chassis by a transport device for transporting the filter solid, i.e. the filter cake.

A device of this type is very practical and can be used at the various locations underground by simple displacement. It delivers the solid pressed out from the sludge in concentrated form. This can be conveyed above ground in appropriately constructed tub-shaped dumpers and there it can be taken to waste dumps or processed in some other way.

Therefore only a fragment of the cost is required with regard to the transportation of the sludge itself. This underground device has a simple construction with which the individual parts are clearly and simply accessible. It is also possible to be able to exchange the individual parts of the apparatus-unit quickly and easily after any damage etc. has occurred.

Advantageously the chassis carrying the pump unit has a further container for receiving the sludge. This container is used for the homogenisation of the sludge for conveying through the pump. It is therefore preferably provided with an agitation- or whirling device, e.g. a driven worm or the like. The pump unit itself can be arranged laterally on the first chassis on the end facing the second chassis. Thus a large available space is obtained for the sludge-collecting container on the first chassis. This can extend near the pump unit and behind this on the first chassis.

Preferably a chamber filter press is used as the filter installation of the second chassis. The chamber filter press is advantageously provided with a crushing device for the resultant filter cake, which, for example, may comprise a vibratory cake chopper or the like. Under the filter installation there is preferably a conveyor belt. This is advantageously so designed that it projects over the end of the third chassis facing the second chassis.

According to further feature of the invention, the transportation device of the third chassis can begin its inclination below the end of the conveyor belt of the second chassis. The other end of the transportation device is provided to be substantially projecting so that the conveyor material can be satisfactorily emptied into a tub of a movable dumper. It is advisable to form the transportation device of the third chassis from several conveyor belts or the like arranged one behind the other. Preferably the projecting part of the transportation device for the filter material is arranged to be longitudinally displaceable so that the dumping point can be set-up to be locally different according to the respective size of the attached tub.

In the underground device, the drive apparatus for all the parts of the device to be driven is provided with pneumatic drive. The device is advisably so divided as regards the chassis structures (sub-frames) that the frames are the same length as each other. This has the advantage that standardised sub-frames can be used for all three parts of the device-unit.

With the above and other objects in view that will hereinafter appear, the nature of the invention will be more clearly understood by reference to the following detailed description, the appended claims and the several views illustrated in the accompanying drawings.

The invention is described below by means of an embodiment shown in the drawing.

Figure 2:
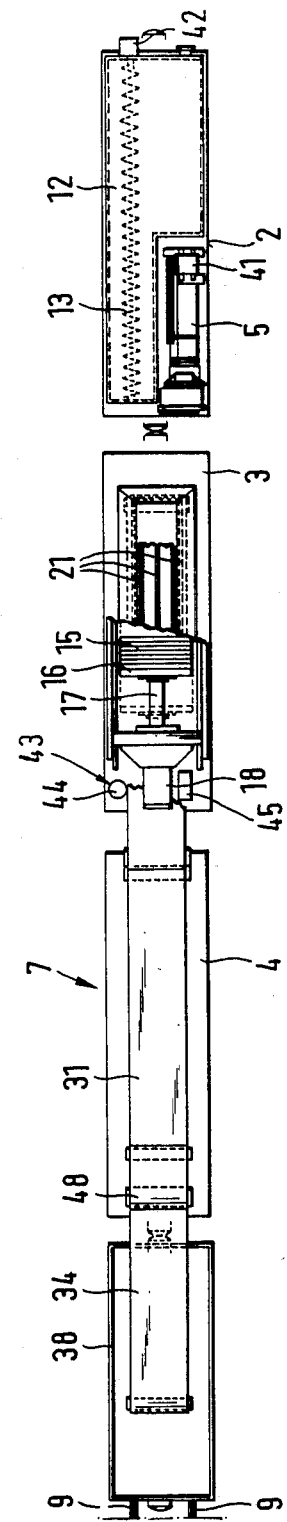

FIG. 1 shows in side view and schematically an elevation (outline) of the sludge handling apparatus of the invention for use in underground mining; and FIG. 2 shows schematically a plan view of the apparatus.

The underground device for draining mining sludge and the like is a movable unit 1 comprising three vehicle chassis 2, 3, and 4 connected rigidly together. This mobile unit 1 has a first chassis 2 with a pump unit 5, a second chassis 3 with a filter installation 6, and a third chassis 4 with a transportation device 7, wherein the chassis are rigidly connected or coupled. The chassis 2, 3 and 4 advantageously have the same construction and length. They are two-axle sub-frames with the running wheels 8 which are guided on rails 9. Preferably the sub-frames are simple platform wagons (trucks) which push against each other by means of buffers 10.

The first sub-frame 2 has, apart from the pump installation 5, which advantageously is a diaphragm-, e.g. hose pump, a container 12 which in the base (in area) occupies the largest part of the loading area of the sub-frame 2. The pump unit 5 is located principally on the end of the chassis 2 facing the chassis 3, and on one side of the first chassis 2 so that the container 12 receiving the sludge is located near the pump unit and behind it. The container 12 is used for the homogenisation of the mining sludge in it, and has an agitating device or the like. This agitating device 13, which may comprise a rotating worm or the like, extends over the entire length of the container and also on the part of the container located near the pump unit 5.

The filter installation 6 of the second chassis 3 is advantageously a chamber filter press. The filter frames 15 are pressed together by means of the piston 16 with the piston rod 17 and the pressure cylinder 18. Below the filter press 6 there is preferably a trough 19 for receiving the filter cake after the frame has been released. The filter cake can be crushed in the trough by means of a cake chopper 20 which is equipped with blades 21. The crushing is preferably achieved by a vibration effect, and vibrators can be provided for this purpose.

Below the cake trough 19 there is arranged a conveyor belt 23 which runs over the guide rollers 24 and 25. The end part 23a of the conveyor belt 23 projects over the sub-frame 3 at the end facing the third sub-frame 4. The conveyor belt 23 can be arranged on the whole to be somewhat displaceable in the longitudinal direction. The spindle thrust for the conveyor belt displacement is referenced 27. There is a hose connection 28 from the pump unit 5 to the filter installation 6, by means of which the pumped mining sludge is fed under pressure into the filter press. The residual liquid in the filter installation 6 can drain away by means of the hose 29.

The transportation device 7 of the third chassis 4 is advantageously comprised of several transportation devices. The transportation device 31 as a conveyor belt is provided to be upwardly inclined in the direction of the free end of the sub-frame 4, wherein the lower guide roller 32 of the conveyor belt 31 begins below the end of the conveyor belt 23 of the second sub-frame 3. The transportation device can be provided with lateral guard plates 33. The second conveyor belt 34 of the transportation device 7 on the third sub-frame 4 is provided to project substantially over the sub-frame 4. For this purpose the conveyor belt 34 is arranged to be longitudinally displaceable in the holding device 36. The projection of the conveyor belt can be over a wide stretch so that an attached dumper 38 can be loaded with the filter cake over a large part of its length by appropriate pushing-out of the conveyor belt 34 over the conveyor chute 39.

All the parts of the underground device 1 that are to be driven are provided with pneumatic drives. The sub-frame 2 has the pneumatic drives 41 and 42 for the pump unit 5 and the agitating device 13. In the sub-frame 3 there is provided a pneumatic drive 43 for an oil pump 44 with the hydraulic station 45 for the transportation device 7 of the next sub-frame. The filter installation can have the pneumatic drive 46, and the conveyor belt 23 the pneumatic drive 47. The pneumatic drive for transportation device 31 is referenced 48. The displacement of the conveyor belt 34 can also be effected in a pneumatic-hydraulic manner. If a unit of the sub-frames is to be replaced in the case of damage or the like, this is effected preferably by exchange of the whole sub-frame, whereby separation of the sub-frames from each other has to be carried out. In addition the underground device can be constructed to be self-propelled.

Although in a preferred embodiment of the invention as has been specifically illustrated and described herein, it is to be understood that minor variations may be made in the apparatus without departing from the spirit and scope of the invention, as defined in the appended claims.

I claim:

1. An apparatus for treating sludge comprising in successive order:
   (a) a container vehicle, a filter unit vehicle and a conveyor vehicle,
   (b) said container vehicle including a container for receiving sludge, means for agitating the sludge in said container, and pump means for pumping said sludge from said container to said filter unit vehicle,
   (c) said filter unit vehicle including filter installation means in the form of a chamber filter press for receiving the sludge from said pump means and for making filter cakes therefrom, said filter unit vehicle further including chopper means beneath said chamber filter press for receiving and crushing said filter cakes, said filter unit vehicle further including first conveyor means beneath said chopper means for conveying the crushed filter cake to said conveyor vehicle,
   (d) and said conveyor vehicle including second conveyor means for receiving the crushed filter cakes from said first conveyor means and further conveying the crushed filter cakes.

2. The apparatus for treating sludge as defined in claim 1 including a mobile collecting vehicle having container means for collecting the crushed filter cakes from said second conveyor means.

3. The apparatus for treating sludge as defined in claim 1 wherein said agitating means extends along generally the length of said container.

4. The apparatus for treating sludge as defined in claim 1 including a mobile-collecting vehicle for collecting the crushed filter cakes from said second conveyor means, and said adgitating means extends along generally the length of said container vehicle container.

5. The apparatus for treating sludge as defined in claim 1 wherein said chopper means includes a cake chopper having blades.

6. The apparatus for treating sludge as defined in claim 1 wherein said second conveyor means of said conveyor vehicle includes at least two successively arranged conveyor belts.

7. The apparatus for treating sludge as defined in claim 6 including pneumatic drive means for powering said agitating means, said pump means, and said filter press.

8. The apparatus for treating sludge as defined in claim 6 wherein said chopper means includes a cake chopper having blades.

9. The apparatus for treating sludge as defined in claim 1 including means for supporting said second conveyor means for longitudinal displacement thereof.

10. The apparatus for treating sludge as defined in claim 9 including pneumatic drive means for powering said agitating means, said pump means, and said filter press.

11. The apparatus for treating sludge as defined in claim 9 wherein said chopper means includes a cake chopper having blades.

12. The apparatus for treating sludge as defined in claim 1 including pneumatic drive means for powering said agitating means, said pump means, and said filter press.

13. The apparatus for treating sludge as defined in claim 12 wherein said chopper means includes a cake chopper having blades.

* * * * *